United States Patent [19]
Borman et al.

[11] 3,969,306
[45] July 13, 1976

[54] STABILIZED POLYESTER COMPOSITIONS

[75] Inventors: Willem F. H. Borman, Pittsfield; Eugene P. Reilly, Lenox, both of Mass.

[73] Assignee: General Electric Company, Pittsfield, Mass.

[22] Filed: Nov. 20, 1972

[21] Appl. No.: 307,925

[52] U.S. Cl. ............... 260/33.6 R; 260/31.8 XA; 260/33.6 UA; 260/37 R; 260/37 M; 260/40 R; 260/42.18; 260/45.7 P; 260/45.9 R; 260/45.95 L; 260/873
[51] Int. Cl.² .......................................... C08L 67/06
[58] Field of Search ......... 260/37 R, 45.7 P, 45.9 S, 260/45.9, 873, 33.6 R, 45.7 R, 31.8 XA, 33.6 UA

[56] References Cited
UNITED STATES PATENTS

| | | | |
|---|---|---|---|
| 2,465,319 | 3/1949 | Whinfield et al. | 260/75 |
| 3,047,539 | 7/1962 | Pengilly | 260/75 |
| 3,218,287 | 11/1965 | Schmidle | 260/33.6 R |
| 3,361,846 | 2/1968 | Gleim et al. | 260/45.7 P |
| 3,598,882 | 8/1971 | Brinkmann et al. | 260/873 |

OTHER PUBLICATIONS

Journal of Polymer Science (1961) vol. XLIX, issue 152, pp. S9 to S11.

*Primary Examiner*—Carman J. Seccuro
*Attorney, Agent, or Firm*—William F. Mufatti; George B. Finnegan, Jr.; Rocco S. Barrese

[57] ABSTRACT

High molecular weight polyesters, such as poly(alkylene terephthalates), are stabilized against deterioration by heat, oxidation, and the like, with a stabilizer comprising a polybutadiene, with high vinyl content. Also provided are reinforced embodiments of the stabilized compositions.

25 Claims, No Drawings

STABILIZED POLYESTER COMPOSITIONS

The present invention is concerned with thermoplastic polyester compositions. More particularly, it relates to polyesters which have been stabilized against deterioration due, e.g., to heat, molecular oxidation and/or light.

BACKGROUND OF THE INVENTION

High molecular weight linear thermoplastic polyesters, such as poly(ethylene terephthalate) and poly(1,4-butylene terephthalate) are well known as film and fiber-formers and they are provided by methods outlined in Whinfield et al. U.S. Pat. No. 2,465,319 and Pengilly, U.S. Pat. No. 3,047,539, and elsewhere.

Polyester resins, such as poly(alkylene terephthalates, isophthalates and mixed iso- and terephthalates), particularly poly(1,4-butylene terephthalate), also provide excellent molding compositions because they can be fabricated with moderate stock temperatures, low mold temperatures and rapid cycle times. Because of their unusual combination of properties, these resins are superior in chemical resistance, thermal stability and product appearance (they have a smooth, glossy finish). Such resins also have superior strength, stiffness, low friction and wear properties and good resistance to brittle fracture. The polyester resins can also be provided in reinforced embodiments.

Solid polyester resins of the type mentioned have found extensive use in various forms of thermoplastic structures. Many different articles of manufacture are produced from polyester compositions by molding and shaping at higher temperatures because they remain relatively rigid at ordinary room temperature. Polyester fibers are also useful in woven articles and films therefrom are both useful as mechanical supports and as barriers and also they have useful protective coating applications. Although the thermoplastic molding and coating compositions have the outstanding properties mentioned above, they unfortunately are subject to polymeric degradation during processing due to thermal and oxidation instability of the polyester component. Deterioration caused by heat and/or oxygen will lead to loss of electrical properties and/or to discoloration, embrittlement, and especially loss of physical properties such as tensile strength and impact strength. Additionally, discoloration, which is undesirable in some uses, may occur if the polyester resin composition is not stabilized with proper amounts and kinds of stabilizers.

Poly(alkylene terephthalate) and particularly poly(1,4-butylene terephthalate) undergo a gradual degradation due to thermal decomposition during processing, e.g., extrusion, compounding and molding. This degradation is due to thermal scission, and is accompanied by a decrease in melt viscosity and a deterioration of the polyester's physical and mechanical properties. Thermal scission can be observed experimentally by a drop in melt viscosity in well-known instruments, such as an extrusion plastometer melt indexer (e.g., ASTM D-1238) in which the molten material is forced through a standard orifice and the rate of extrusion (e.g., unit weight recovered in a fixed time) is measured and recorded. Typically, degradation in chain length due to thermal scission is reflected in a higher melt index. If the data are numerically expressed, for example, a decrease in the logarithm of the melt viscosity per minute time $[\Delta(\log \eta)/\Delta t]$, the so-called degradation constant is provided and this can be compared with controls. Typical values for the degradation constant of poly(1,4-butylene terephthalate) are $6 \times 10^{-3}$ min$^{-1}$ (250°C.); and $12 \times 10^{-3}$ min$^{-1}$ (260°C.).

Typical methods will be described hereinafter.

Commonly employed stabilizers for polyester resin systems such as the hindered phenols and phosphite chelators, improve the long-term oxidative stability of the compositions, but have no effect whatsoever on the melt stability as measured by degradation constant.

Surprisingly, however, it has now been found that small amounts of polybutadienes, containing high amounts, e.g., > 85 mol % of the units of vinyl unsaturation vastly improve the melt stability of polyester resins.

By way of illustration, poly(1,4-butylene terephthalate) containing 1 part of hydroxy-terminated polybutadiene had degradation constants of $-3.3 \times 10^{-3}$ min$^{-1}$ (250°C.); $-4.5 \times 10^{-3}$ min$^{-1}$ and $-5.6 \times 10^{-3}$ min$^{-1}$ (260°C., duplicate tests). The minus sign indicates a most desirable increase in melt viscosity. Moreover, with 0.2 parts of a phenolic antioxidant included, the degradation constants were also excellent: $0.28 \times 10^{-3}$ min$^{-1}$; $1.33 \times 10^{-3}$ min$^{-1}$; and $-1.14 \times 10^{-3}$ min$^{-1}$ (250°C., triplicate determinations).

In addition to stabilizing the melt viscosity, the high vinyl polybutadiene also retarded discoloration of the polyester composition due to thermal oxidation of the melt.

It is, accordingly, a principal object of the invention to provide stabilized compositions of normally unstable polyester resins, which are normally rigid at room temperature. It is another object of the invention to provide such stabilized compositions by incorporating in a normally unstable high molecular weight polyester resin a minor portion of a stabilizer which comprises a high vinyl polybutadiene and, optionally, a hindered phenolic antioxidant and/or an organic phosphite cos- tabilizer. It is a further object to provide reinforced embodiments of such stabilized compositions.

DESCRIPTION OF THE INVENTION

The above-mentioned objects and advantages are secured according to the present invention with stabilized compositions comprising a high molecular weight polyester resin normally tending to undergo thermal scission and a stabilizing quantity of a polybutadiene, having a vinyl content of at least 85% (of the unsaturated polymer units).

The butadiene can be terminated with a wide variety of atoms or groups, such as hydrogen, hydroxyl, carboxyl, alkoxyl, carboalkoxyl, and the like, but hydrogen-, hydroxyl- and carboxyl-terminated polybutadienes are preferred because they are most readily available commercially.

A preferred feature of this invention is to provide reinforced thermoplastic compositions comprising A. a stabilized polyester resin composition as defined above and B. a reinforcing amount of a reinforcing filler or a mixture of such fillers for said combination.

Another preferred feature is to provide stabilized and reinforced, stabilized compositions as above defined which also include small, effective amounts of hindered phenol antioxidants, and/or an organic phosphite-type costabilizer.

The term "high molecular weight polyester normally tending to undergo thermal scission" includes, in general, linear saturated condensation products of diols and dicarboxylic acids, or reactive derivatives thereof. Preferably, they will comprise condensation products of aromatic dicarboxylic acids or esters and aliphatic diols. It is to be understood that it is also possible to use polyesters such as poly(1,4-dimethylolcyclohexane dicarboxylates, e.g., terephthalates). In addition to phthalates, small amounts, e.g., from 0.5 to 15% by weight, of other aromatic dicarboxylic acids, such as naphthalene dicarboxylic acid, or aliphatic dicarboxylic acids, such as adipic acid, can also be present in preferred compositions. The diol constituent can likewise be varied, in the preferred embodiments, by adding small amounts of cycloaliphatic diols. In any event, the preferred polyesters are well known as film and fiber formers, and they are provided by methods outlined in Whinfield, U.S. Pat. No. 2,465,319 and Pengilly, U.S. Pat. 3,047,539 and elsewhere. The preferred polyesters will comprise a poly(alkylene terephthalate, isophthalate or mixed isophthalate-terephthalate, e.g., up to 30 mol % isophthalate), said alkylene groups containing from 2 to 10 carbon atoms, e.g., poly(ethylene terephthalate) or poly(1,4-butylene terephthalate). Because of its rapid crystallization from the melt, it is preferred to use poly(1,4-butylene terephthalate) as the normally unstable polyester resin component of the present compositions.

The molecular weight of the polyester component should be sufficiently high to provide an intrinsic viscosity of about 0.6 to 2.0 deciliters per gram, preferably 0.7 to 1.6 dl./g., measured, for example, as a solution in a 60:40 mixture of phenol and tetrachloroethane at 30°C.

The polybutadienes having > 85 mol % of vinyl content can be made by techniques well known to those skilled in the art. Their idealized chemical structure is

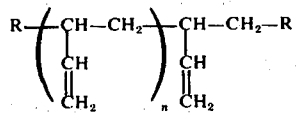

in which R may be, for example, H, (CH$_2$)$_2$—OH, or —COOH, and $n$ is a value which gives molecular weights in the range of oils up to solids, e.g., from about 500 to about 5000, or higher.

They are prepared by Na catalyzed polymerization of butadiene, followed by termination with the proper agents to yield the desired terminal groups (e.g., water, ethyleneoxide, or CO$_2$).

The materials are commercially available from HYSTL Development Company, New York, N.Y., 10017. In general, they are viscous colorless to light yellow liquids. They will be described in more detail hereinafter.

Any effective amount of the stabilizer can be used in the compositions of this invention. In general, however, the hydroxyterminated polybutadiene will comprise from about 0.05 to about 5.0 parts, and preferably from about 0.25 to about 2.5 parts by weight per 100 parts by weight of the unstable polyester resin component in the composition. On the same basis, if the optional phenolic antioxidants and/or organic phosphite costabilizer are present, small, effective amounts will be employed, but, in general, these will comprise from about 0.005 to about 1.0, and preferably from about 0.01 to about 0.25 parts by weight based on 100 parts by weight of said polyester.

It should be understood that the polybutadiene is also useful to stabilize the high molecular weight polyesters in further combination with other additive agents, such as, e.g., chelating agents, carbon black, plasticizers, lubricity promotors, color stabilizers, ultraviolet absorbers, X-ray opacifiers, dyes, pigments, fillers, flame-retardant agents, and the like.

As has been mentioned a preferred class of compositions will comprise the stabilized polyester resin and a reinforcing amount of a reinforcing filler. In general, any reinforcement can be used, e.g., fibers, whiskers or platelets of metals, e.g., aluminum, iron or nickel, and the like, and non-metals, e.g., ceramics, carbon filaments, silicates, asbestos, TiO$_2$ and titanate whiskers, quartz, glass flakes and fibers and the like. It is to be understood that, unless the filler adds to the strength, stiffness and impact strength of the composition, it is only a filler and not a reinforcing filler as contemplated herein.

Although it is only necessary to have at least a reinforcing amount of the reinforcement present, in general, the filler will comprise from about 1 to about 80 parts by weight based on 100 parts by weight of the polyester resin component and the filler.

In particular, the preferred reinforcing fillers are of glass and it is preferred to use fibrous glass filaments comprised of lime-aluminum borosilicate glass that is relatively soda free. This is known as "E" glass. However, other glasses are useful where electrical properties are not so important, e.g., the low soda glass known as "C" glass. The filaments are made by standard processes, e.g., by steam or air blowing, flame blowing and mechanical pulling. The preferred filaments for plastic reinforcement are made by mechanical pulling. The filament diameters range from about 0.00012 to 0.00075 inch, but this is not critical to the present invention.

The length of the glass filaments and whether or not they are bundled into fibers and the fibers bundled in turn to yarns, ropes or rovings, or woven into mats, and the like, are also not critical to the invention. However, in preparing the present compositions, it is convenient to use the filamentous glass in the form of chopped strands of from about ⅛ inch to about 1 inch long, preferably less than ¼ inch long. In articles molded from the compositions, on the other hand, even shorter lengths will be encountered because, during compounding, considerable fragmentation will occur. This is desirable, however, because the best properties are exhibited by thermoplastic injection molded articles in which the filament lengths lie between about 0.000005 inch and 0.125 (⅛) inch.

In general, best properties will be obtained if the sized filamentous glass reinforcement comprises from about 1 to about 80% by weight based on 100 parts by weight of the polyester resin and the glass, and preferably from about 5 to about 50 parts by weight. Especially preferably the glass will comprise from about 10 to about 40 parts by weight based on 100 parts by weight of the resin and the glass. Generally, for direct molding use, up to about 60 parts by weight of glass can be present without causing flow problems. However, it is useful also to prepare the compositions containing substantially greater quantities, e.g., up to 70–80 parts by weight of glass. These concentrates can then be custom blended with blends of resins that are not glass reinforced to provide any desired glass content of a lower value.

Hindered phenolic antioxidants comprise a class of compounds whose metes and bounds are well-known to those skilled in the art. In general, however, the most preferred such compounds are of the formula:

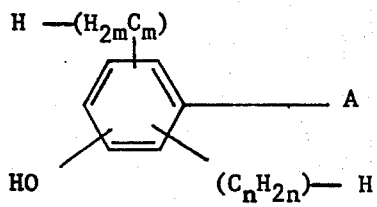

wherein $m$ and $n$ are 0 to 6 and A is

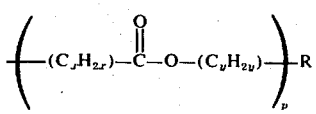

wherein $p$ is from 1 to 6, $x$ is from 0 to 6, $y$ is from 0 to 30 and R is hydrogen, a tetravlent carbon radical or a mono- to hexa-valent hydrocarbon radical of from 1 to 12 carbon atoms; or

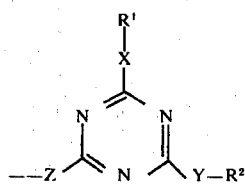

wherein each of $R^1$ and $R^2$ is selected from

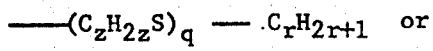

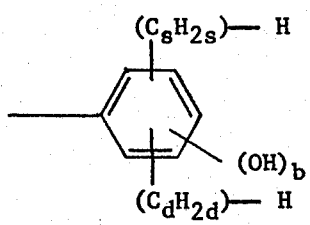

and each of X, Y and Z is selected from —O—, —S— or

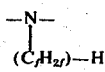

in which each of $s$ and $d$ is from 0 to 6, each of $f$ and $r$ is from 0 to 30, Z is from 2 to 6, $q$ is 0 to 3 and $b$ is 0 or 1.

The preferred phenolic compounds thus include phenolic carboxylic acids, phenolic alkyl carboxylic acids, esters of such acids and phenolic substituted 1,3,5-triazine derivatives. The hydrocarbon substituents on the phenolic ring will be straight or branched chain of from one to six carbon atoms, such as methyl, ethyl, n-pro-pyl, i-propyl, n-butyl, t-butyl, n-pentyl, 2,3-dimethylbutyl, n-hexyl and the like. Preferably, in the compounds of the above formula, the phenol group will be a dialkyl phenolic group in which at least one alkyl group is in a position ortho to the hydroxy group. The other alkyl group is either (a) in the other position ortho to the hydroxy group or (b) meta to the hydroxy group and para to the first alkyl group. Although not so limited, the alkyl groups substituted on the phenol ring are preferably branched groups such as t-butyl.

Within the family of phenolic compounds are preferred species, such as tetrakis-[methylene(3',5'-di-t-butyl-4'-hydroxy)-hydrocinnamate]methane; 2,4-bis-(octylthio)-6-(4'-hydroxy-3',5'-di-t-butylanilino)-1,3,5-triazine; and 2,4-(4-hydroxy-3,4-di-t-butyl-phenoxy)-6-(n-octylthio)-1,3,5-triazine, each of which can be made by means known to those skilled in this art and which, respectively, are available from Ciba-Geigy Corp., Ardsley, N.Y., under product designations IRGANOX 1010, 1093 and 565. Especially preferred are 2,4-bis(octylthio)-6-(4'-hydroxy-3,5-di-t-butylanilino)-1,3,5-triazine and tetrakis-[methylene(-3',5'-di-t-butyl-4'-hydroxy)hydrocinnamate]methane.

Organic phosphite costabilizers also comprise a class of compounds whose metes and bounds are well known to those skilled in the art. In general, however, the most preferred such compounds are of the formula:

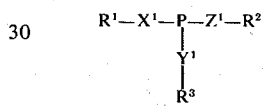

wherein $X^1$, $Y^1$ and $Z^1$ are each selected from —O— and —S— and $R^1$, $R^2$ and $R^3$ are each selected from alkyl of from 6 to 24 carbon atoms, phenyl or alkylphenyl of from 7 to 33 carbon atoms. Illustrative of groups $R^1$, $R^2$ and $R^3$ are hexyl, heptyl, octyl, nonyl, decyl, undecyl, dodecyl, tridecyl, tetradecyl, pentadecyl, hexadecyl, heptadecyl octadecyl, nonadecyl, eicosyl, heneicosyl, docoxyl, tricosyl, tetracosyl, and the like, preferably iso-octyl, decyl, dodecyl and octadecyl, phenyl, or alkyl-phenyl- such as mono- or po-lyalkylphenyl, e.g., tolyl, dimethylphenyl, trimethylphenyl, tetramethylphenyl, pentamethylphenyl, propylphenyl, dipropylphenyl, tripropyl phenyl, tetrapropylphenyl, and the like, nonylphenyl, dinonylphenyl, trinonylphenyl, and the like. The preferred costabilizers will be of the formula:

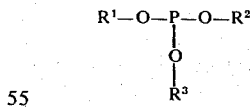

wherein $R^1$, $R^2$ and $R^3$ are as defined above, and illustratively tri-n-octadecylphosphite, tri-iso-octylphosphite, trinonylphenyl phosphite, triluryl phosphite trioctadecyl phosphite, didecylphenyl phosphite, diphenyl decyl phosphite, triphenyl phosphite, and the like. The preferred stabilizers are triphenyl phosphite and diphenyl decyl phosphite. Another preferred costabilizer is diphenyl decyl phosphite, the product designated Ferro 904, which is available commercially from Ferro Corporation, Bedford, Ohio 44146.

The phosphites of the above formula are commercially available or can be readily prepared in conventional ways, e.g., by reaction of phosphorus trichloride with the corresponding alkyl, phenyl or alkylphenyl, hydroxy or mercapto compounds.

The method of blending the compositions of this invention is not critical and can be carried out by conventional techniques. One convenient method comprises blending the polyesters and the stabilizers in powder or granular form, extruding the blend and comminuting into pellets or other suitable shapes.

The reinforcement, if used, and other additives are added in any usual manner, e.g., by dry mixing or by mixing in the melted state in an extruder, on a heated mill or in other mixers.

By way of illustration, glass roving (a bundle of strands of filaments) is chopped into small pieces, e.g., ⅛ to 1 inch in length, and preferably less than one-fourth inch in length and put into an extrusion compounder with the polyester resin and the stabilizers and, optionally, other additive(s) to produce moling pellets. The fibers are shortened and predispersed in the process, coming out at less than one-sixteenth inch long. In another procedure, glass filaments are ground or milled to short lengths, and are mixed with the polyester resin and stabilizers, and, optionally, other additive(s), by dry blending then either fluxed on a mill and ground, or they are extruded and chopped. The glass fibers can also be mixed with resin and additives and directly molded, e.g., by injection or transfer molding techniques.

It is always important to thoroughly free all of the ingredients, the polyester resin, stabilizers, reinforcing filler, if used, from as much water as possible.

In addition, compounding should be carried out to insure that the residence time in the machine is short; the temperature is carefully controlled; the friction heat is utilized; and an intimate blend between the resin and the additives is obtained.

Although it is not essential, best results are obtained if the ingredients are precompounded, pelletized and then molded. Precompounding can be carried out in conventional equipment. For example, after carefully pre-drying the polyester resins, the stabilizers and, optionally, other additives and/or reinforcements, e.g., under vacuum at 110°C. for 12 hours, a single screw extruder is fed with a dry blend of the ingredients, the screw employed having a long transition section to insure proper melting. On the other hand, a twin screw extrusion machine, e.g., a 28 mm. Werner Pfleiderer machine can be fed with resins and additives at the feed port and reinforcement down stream. In either case, a generally suitable machine temperature will be about 450° to 600°F.

The precompounded composition can be extruded and cut up into molding compounds, such as conventional granules, pellets, etc., by standard techniques.

The compositions can be molded in any equipment conventionally used for thermoplastic compositions. For example, good results will be obtained in an injection molding machine, e.g., of the Newbury type, with conventional cylinder temperatures, e.g., 500°F. and conventional mold temperatures, e.g., 150°F. If necessary, depending on the molding properties of the polyester, the amount of additives and/or reinforcing filler and the rate of crystallization of the polyester component, those skilled in the art will be able to make the conventional adjustments in molding cycles to accommodate the composition.

DESCRIPTION OF THE PREFERRED EMBODIMENTS

The following examples illustrate the preparation of certain compositions within the scope of this invention. They are not to be construed to limit the invention in any manner whatsoever. All parts, except as otherwise indicated, are by weight.

The rheometer used in Example 1 is an "Automatic Capillary Rheometer", built by Monsanto Research Corporation, Dayton, Ohio, according to a design by Dr. Samuel Steingiser. It consists of an electrically heated steel cylinder with a removable die at the lower end and a pneumatically driven piston operating within the cylinder.

By a proper choice of orifice dimensions and piston loading, it is possible to cover a wide range of shear stresses under which to measure the melt viscosity of the test specimen.

The rheometer is equipped with 2 sets of four timers. The first set (Type I) is adjusted and is used to automatically initiate a melt viscosity determination. The second set (Type II) measures the time required to extrude a fixed amount of polymer during each of the four determinations.

When the first timer of type I reaches zero ("runs out") the piston is activated through relay-operated valves, allowing compressed gas of pre-determined pressure to enter the pneumatic cylinder and exert a downward force of known magnitude on the piston. Through the action of a calibrated cam, operating limit-switches and relays, a small amount of polymer is forced from the barrel, after which an automatic timer of type II establishes the time required to extrude a constant volume of molten polymer. The pressure is then released from the pneumatic cylinder until the next timer of type I returns to zero, causing the process to repeat itself. Upon completion of the four cycles, the four type II extrusion timers are read and their readings used to calculate melt viscosity and shear rate at the four predetermined elapsed time periods. This allows back-extrapolation of melt viscosity to zero heating time to eliminate the effect of thermal degradation on the melt viscosity determination.

This back-extrapolation is most conveniently done on semilog graph paper, on which melt viscosity is plotted on the logarithmic scale, since a straight line will result whenever the polymer undergoes a normal degradation. The slope of the extrapolation line, representing the ratio of $$\frac{\Delta \log (\text{melt viscosity})}{\Delta \text{time}}$$

is a measure of polymer stability, and its negative value may be used as a "degradation constant". In this case, a value of the degradation constant =0 indicate a stable melt viscosity and no degradation.

A positive value indicates a decreasing melt viscosity, presumably due to degradation. A negative value of the degradation constant, on the other hand, indicates an increasing melt viscosity with time, possibly due to further polymerization, branching, cross-linking, etc.

Calculation of the melt viscosity and shear rate is based on well known equations, using orifice diameters, pressure drop across the orifice, and measurement of extrusion rate.

The relations used for the calculations can be found, amongst others, in table I of ASTM method D 1703-62.

EXAMPLE 1

A composition is prepared comprising 100 parts of poly(1,4-butylene terephthalate), intrinsic viscosity about 1.0 dl./g., and 1.0 parts of a hydroxy-terminated polybutadiene with a vinyl content of > 90% (Hystl Development Co., HYSTL G-3000). The polybutadiene has a molecular weight of 3000 ± 300; a specific gravity of 0.88; a pour point of 23°C., a viscosity of 300–550 poises (45°C.), and a hydroxyl content of about 0.43 meq./gram. The composition is heated and the melt viscosity is measured in a capillary rheometer. The data are calculated in the form of a degradation constant $]\Delta$ (log $\eta$)/$\Delta$ t] and the following values are obtained $-3.3 \times 10^{-3}$ min.$^{-1}$ (250°C.); $-4.5 \times 10^{-3}$ min.$^{-1}$ and $-5.6 \times 10^{-3}$ min.$^{-1}$ (260°C. duplicate determinations). These values indicate that the composition is efficiently stabilized with 1 part of stabilizer per 100 parts of resin.

EXAMPLE 2

The procedure of Example 1 is repeated adding also 0.2 parts of 2,4-bis(octylthio)-6-(4'-hydroxy-3',5'-di-t-butylanilino)-1,3,5-triazine (Ciba-Geigy Co. IR-GANOX 1093). The respective degradation constants at 250°C.: $0.28 \times 10^{-3}$ min.$^{-1}$; $1.33 \times 10^{-3}$ min.$^{-1}$; and $-1.14 \times 10^{-3}$ min.$^{-1}$, demonstrate a significant resistance to thermal scission.

For comparison purposes, the procedure of Example 1 is repeated with poly(1,4-butylene terephthalate), without stabilizer. The degradation constants are $6 \times 10^{-3}$ min.$^{-1}$ (250°C.) and $12 \times 10^{-3}$ min.$^{-1}$ (260°C.). It is seen that the control shows a high degradation constant demonstrating a typical deterioration under the influence of heat.

EXAMPLE 3

An alternate method of determining melt stability is to heat the polymeric mixture in a torque rheometer, such as the Brabender Plastometer, and to determine the decrease in torque with time. Under these conditions, the degradation constant can be defined, in analogy with the previous method, as the negative value of the ratio of the decrease in the logarithm of the torque and the elapsed time period in minutes. A typical value for dried, unstabilized poly(1,4-butylene terephthalate) by this method is $12 \times 10^{-3}$ at 260°C. melt temperature. In comparison, with the addition of 1% of a nonfunctional, H-terminated polybutadiene of high vinyl content this value decreased to $4.7 \times 10^{-3}$ at 260°C., showing efficient stabilization. The H-terminated polybutadiene (Hystl B-2000) has a molecular weight of 2000 ± 200; specific gravity of 0.86; pour point of 8°C.; viscosity of 30–140 poises at 45°C. and a minimum vinyl content of 90%.

EXAMPLE 4

In an extruder operated at 470°F. are blended 69.8 parts of unstabilized poly(1,4-butylene terephthalate), intrinsic viscosity, 1.0 dl./g., 30 parts by weight of one-eighth inch chopped filamentous glass reinforcement and 0.5 parts by weight of hydroxy-terminated polybutadiene having > 90% vinyl content. The blended composition is injection molded into test pieces which are subjected to physical testing. In comparison with unstabilized controls, reinforced work pieces with excellent retention of physical and mechanical properties are obtained.

EXAMPLE 5

A composition comprising poly(1,4-butylene terephthalate) and the indicated quantities of stabilizers is prepared and molded in a reciprocating screw injection molding machine. For comparison purposes, poly(1,4-butylene terephthalate), without additives, is molded under identical conditions. The physical properties of the molded pieces are determined by standard procedures. The formulations employed and the results obtained are summarized in Table 1:

Table 1

| Melt-stabilized Polyester Resin Compositions | | |
|---|---|---|
| Example | 5 | 5C* |
| Formulation (parts by weight) | | |
| poly(1,4-butylene terephthalate) | 98.80 | 100.0 |
| H-terminated polybutadiene, with >90% vinyl content** | 1.00 | — |
| tetrakis [methylene(3',5'-di-t-butyl-4'-hydroxy)hydrocinnamate] methane*** | 0.15 | — |
| mixed phenyl-decyl phosphites**** | 0.05 | — |
| Properties | | |
| tensile strength, psi. | 7330 | 7210 |
| elongation, % | 356 | 181 |
| notched Izod impact strength ft.-lbs./in. | 0.73 | 0.67 |
| Gardner falling dart impact strength, in.-lbs. | 420 | 252 |

*control, no additives.
** Hystl B-2000
***Ciba-Geigy, IRGANOX 1010
****Ferro Corp., Product 904

The parts made from the stabilized composition have excellent appearance and much enhanced ductility as measured by impact strength and elongation.

Surprisingly, polybutadienes of much lower relative vinyl concentrations, such as obtained by free radical polymerization of butadiene, in general had little or not stabilizing effect upon the polyester.

Other modifications of the above examples provide compositions within the scope of this invention.

For example, for poly(1,4-butylene terephthalate), substitute poly(ethylene terephthalate); a 98/2 1,4-butylene terephthalate-1,4-butylene isophthalate copolyester; a 99/1 1,4-butylene terephthalate-1,4-butylene adipate copolyester; or a 98/2 1,4-butylene terephthalate-glycerol terephthalate copolyester.

For the hydroxy-terminated polybutadiene of Example 1 (HYSTL G-3000), substitute:

a hydroxy-terminated polybutadiene having greater than 90% vinyl content (based on total unsaturation) and a molecular weight of 1350 ± 150; sp. gr. of 0.88; pour point of 3°C.; viscosity of 25–100 poises at 45°C.; and 1.18 meq./g. of hydroxyl content (HYSTL G-1000) and a hydroxy-terminated polybutadiene having greater than 90% vinyl content (based on total unsaturation) and a molecular weight of 2000 ± 200; a specific gravity of 0.88; a pour point of 17°C.; a viscosity of 100–350 poises at 45°C.; and 0.75 meq./g. of hydroxyl content (HYSTL G-2000).

For the hydrogen-substituted polybutdiene of Example 3, substitute:

a H-substituted polybutdiene having a vinyl content of about 85%; a molecular weight of 1050 ± 150; a sp.

gr. of 0.86; a pour point of −15°C.; and viscosity of 5–15 poises at 45°C.; (HYSTL B-1000); and a H-substituted polybutadiene having a vinyl content of about 90%; a molecular weight of 3000 ± 300; sp. gr. of 0.87; pour point of 17°C.; nd a viscosity of 150–350 poises at 45°C.

For the hydroxy-terminated polybutadiene of Example 1, substitute:

a carboxy-polybutadiene having a vinyl content of > 90% of the total unsaturation; a molecular weight of 1350 ± 150; a sp. gr. of 0.90; a pour point of about 7°C.; a viscosity of 50–200 at 45°C.; and a carboxyl content of about 1.11 meq./g. (HYSTL C-1000); and a carboxy-polybutadiene having a vinyl content of > 90% of the total unsaturation; a molecular weight of 2000 ± 200; a sp. gr. of 0.90; a pour point of about 20°C.; a viscosity of about 300–800 poises at 45°C.; and a carboxyl content of about 0.70 meq./g. (HYSTL C-2000).

For the glass fibers, the following reinforcing fillers can be substituted: aluminum powder; asbestos fibers; silicate; bronze powder; ceramic fibers; titanate fibers; quartz and carbon black.

Because of their excellent physical, mechanical, chemical, electrical and thermal properties, the polyester compositions of this invention have many and varied uses. The compositions may be used alone as molding powders or mixed with other polymers and may contain additional, non-reinforcing fillers, such as wood flour, cloth fibers, clays and the like, as well as flame retardant agents, pigments, dyes, stabilizers, plasticizers, and the like.

Obviously, other modifications and variations of the present invention are possible in the light of the above teachings. It is, therefore, to be understood that changes may be made in the particular embodiments of this invention described which are within the full intended scope of the invention as defined by the appended claims.

We claim:
1. A stabilized composition comprising
   i. a high molecular weight linear polyester resin normally tending to undergo thermal scission and
   ii. a stabilizing quantity of a polybutadiene, having a vinyl content of at least 85%.
2. A stabilized composition as defined in claim 1 wherein said polybutadiene is terminated with a member selected from the group consisting of hydrogen, hydroxyl and carboxyl.
3. A stabilized composition as defined in claim 1 wherein said polyester resin is a poly(alkylene terephthalate, isophthalate or mixed isophthalate-terephthalate), said alkylene groups containing from 2 to 10 carbon atoms.
4. A stabilized composition according to claim 3 wherein said polyester resin is poly(1,4-butylene terephthalate).
5. A stabilized composition as defined in claim 1 wherein said polybutadiene comprises from about 0.05 to about 5.0 parts by weight per 100 parts by weight of the polyester resin component in said composition.
6. A reinforced stabilized composition comprising
   A. a stabilized composition comprising
      i. a high molecular weight linear polyester resin normally tending to undergo thermal scission
      ii. a stabilizing quantity of a polybutadiene, having a vinyl content of at least 85%; and
   B. a reinforcing amount of a reinforcing filler for said stabilized composition.
7. A composition as defined in claim 5 wherein said polybutadiene is terminated with a member selected from the group consisting of hydrogen, hydroxyl and carboxyl.
8. A composition as defined in claim 6 wherein the reinforcing filler B comprises from about 1 to about 80 parts by weight based on 100 parts by weight of the polyester resin component and the filler.
9. A composition as defined in claim 6 wherein said polyester resin is poly(1,4-butylene terephthalate).
10. A composition as defined in claim 6 wherein reinforcing filler B is selected from the group consisting of reinforcing metals, ceramics, silicates, quartz, glass and carbons.
11. A composition as defined in claim 10 wherein said reinforcing filler is filamentous glass, in an amount of from about 1 to about 80 parts by weight based on 100 parts by weight of the polyester resin component and the glass.
12. A reinforced, stabilized composition as defined in claim 6 wherein said polybutadiene comprises from about 0.05 to about 5.0 parts by weight per 100 parts by weight of said polyester resin and said reinforcing filler B is flamentous glass and comprises from about 5 to about 50 parts by weight based upon 100 parts by weight of the polyester resin and the glass.
13. A stabilized composition as defined in claim 1 wherein said polyester resin is poly(1,4-butylene terephthalate) and said polybutadiene comprises from about 0.25 to about 2.5 parts by weight per 100 parts by weight of the polyester resin component in said composition.
14. A reinforced stabilized composition as defined in claim 6 wherein said polyester resin is poly(1,4-butylene terephthalate); said polybutadiene comprises from about 0.25 to about 2.5 parts by weight per 100 parts by weight of said polyester resin; and said reinforcing filler is filamentous glass, in an amount of from about 10 to about 40 parts by weight based upon 100 parts by weight of the polyester resin and the glass.
15. A stabilized composition as defined in claim 1 which also includes a small, effective amount of a hindered phenol antioxidant.
16. A stabilized composition as defined in claim 15 wherein said hindered phenol is 2,5-bis(octylthio)-6-(4′-hydroxy-3′,5′-di-t-butylanilino)-1,3,5-triazine or tetrakis-[methylene(3′,5′-di-t-butyl-4′-hydroxy)hydrocinnamate]methane and comprises from about 0.05 to about 0.25 parts by weight based on 100 parts by weight of said polyester.
17. A reinforced, stabilized composition as defined in claim 6 which also includes a small, effective amount of a hindered phenol antioxidant.
18. A reinforced, stabilized composition as defined in claim 17 wherein said hindered phenol is 2,4-bis(octylthio)-6-(4′-hydroxy-3′,5′-di-t-butylanilino)-1,3,5-triazine or tetrakis-[methylene(3′,5′-di-t-butyl-4′-hydroxy)hydrocinnamate]methane and comprises from about 0.05 to about 0.25 parts by weight based on 100 parts by weight of said polyester.
19. A stabilized composition as defined in claim 1 which also includes a small, effective costabilizing amount of an organic phosphite compound.
20. A reinforced, stabilized composition as defined in claim 6 which also includes a small, effective costabilizing amount of an organic phosphite compound.

21. A stabilized composition comprising
i. a high molecular weight linear polyester resin normally tending to undergo thermal scission and
ii. a stabilizing quantity of a viscous, colorless to light yellow liquid polybutadiene, having a vinyl content of at least 85%.

22. A stabilized composition as defined in claim 21 wherein said polybutadiene is terminated with a member selected from the group consisting of hydrogen, hydroxyl and carboxyl.

23. A stabilized composition as defined in claim 21 wherein said polyester resin is a poly(alkylene terephthalate, isophthalate or mixed isophthalate-terephthalate), said alkylene groups containing from 2 to 10 carbon atoms.

24. A stabilized composition according to claim 23 wherein said polyester resin is poly(1,4-butylene terephthalate).

25. A stabilized composition as defined in claim 21 wherein said polybutadiene comprises from about 0.05 to about 5.0 parts by weight per 100 parts by weight of the polyester resin component in said composition.

* * * * *